UNITED STATES PATENT OFFICE.

MEYER WILDERMANN, OF EALING, LONDON, ENGLAND.

PROCESS FOR THE MANUFACTURE OF EBONITES RESISTING THE ACTION OF CHLORIN.

1,022,014.   Specification of Letters Patent.   Patented Apr. 2, 1912.

No Drawing.   Application filed October 2, 1908. Serial No. 455,874.

*To all whom it may concern:*

Be it known that I, MEYER WILDERMANN, a subject of the Czar of Russia, and residing at 10 Elders road, Ealing, in the county of London, England, have invented a certain new and useful Process for the Manufacture of Ebonites Resisting the Action of Chlorin, of which the following is a specification.

This invention relates to the production of ebonites capable of resisting the action of chlorin.

For many purposes in the chemical industry an ebonite is required which is capable of resisting the action of alkalis and of chlorin, for instance, in case of apparatus used for electrolysis where the iron parts are coated with ebonite. While various known ebonites can well resist the action of alkalis, they are not capable of withstanding chlorin. Also the so-called Jenkin's mixtures which contain graphite fall to pieces under the action of chlorin. It has been already attempted to produce ebonites capable of resisting the action of chlorin. The known methods, however, employed for this purpose consisted in the purely artificial and empirical preparation of all sorts of mixtures without any chemical or scientific basis, and for this reason attempts at getting an ebonite capable of resisting the action of chlorin have failed. There can however be no doubt that the chemical problem to be dealt with is a very complicated one, and the applicant has for this reason attempted to solve this by the help of scientific considerations, and has thereby produced ebonites capable of fulfilling the requirements of resisting the action of chlorin.

The applicant was guided by the following considerations:—Raw-rubber is, as known, a hydro-carbon of the empirical formula $C_5H_8$. The investigations of Weber and others made it very probable that the hydrocarbon of raw rubber has the formula $C_{10}H_{16}$, in reality rubber however is a colloid, therefore a polyprene of a very high molecular weight thus a multiple of the formula $C_5H_8$. The investigations of Tilden, Gladstone and Hibbert, Ipatiew and Wittorf made it probable that the polyprene contains two double bonds. Gladstone and Hibbert obtained compounds of the composition $C_{10}H_{16}Br_4$ and $C_{10}H_{15}Br_5$, but could not obtain the compound $C_{10}H_{16}Br_6$. Gladstone and Hibbert assumed on the basis of their optical measurements that polyphene contains three double bonds. The investigations of the applicant however have proved that the first assumption is the correct one and that the polyprene contains two double bonds only. It is also known that more than two atoms of sulfur cannot combine chemically with the polyprene. It thus follows that in case of the product $C_{10}H_{15}Br_5$, four atoms of bromin have saturated two double bonds while the 5th bromin atom has acted by substitution of one of the hydrogen atoms of the $C_{10}H_{16}$. For this reason to get an ebonite which is capable of resisting the action of chlorin, I have found it necessary to carry out the manufacture in such a manner that the two double bonds in the polyprene are saturated, whereby the action of chlorin is restricted to the slow process of substitution, the process of addition of chlorin to unsaturated compounds being very much more vigorous than that of substitution in saturated compounds which is comparatively a very slow one.

In the preparation of soft and hard rubber, part of the sulfur used combines, as is known, with the rubber chemically while another part of the sulfur remains uncombined. The action of sulfur in the ordinary vulcanization consists therefore in only partially saturating the double bonds of the polyprene chiefly because the amount of sulfur used is usually smaller than it is necessary for the production of the formula $C_{10}H_{16}S_2$, and because the vulcanization is not long enough to sufficiently saturate the double bonds with sulfur. Though in Gutrie's mixture 33% sulfur is used, this mixture is only normally vulcanized, the vulcanization taking only from 5 to 8 hours, a time which is not nearly sufficient to produce an ebonite capable of resisting the action of chlorin because the double bonds of the hydro-carbon cannot be sufficiently saturated in such a time. In order to get an ebonite capable of resisting the action of chlorin it was therefore necessary to saturate the remaining unsaturated bonds of the hydrocarbon, either by chlorin or by sulfur. In the first case a product is obtained which disintegrates, and there is nothing to prevent the penetration of chlorin through the chlorinated layer to the still unaffected ebonite, so that a rapid and continuous destruction of the ebonite takes place.

In the case of sulfur there is no such difficulty and a product can be obtained which is unable to take up chlorin by addition if the vulcanization is continued long enough. If the mixture $C_{10}H_{16}S_2$ is overvulcanized which in the ordinary ebonite manufacture is regarded as a wrong vulcanization, because a series of physical properties such as flexibility and elasticity suffer, we get a product which is completely uniform and the chlorinated surface of which remains quite coherent. In all cases where the chemical and not the physical properties of the ebonite are of importance, the applicant has found therefore in overvulcanization with the requisite amount of sulfur a means of producing a material which is capable of resisting the action of chlorin, and which is the more capable of resisting such action the more the ebonite is overvulcanized, i. e., the more sulfur combined chemically with the polyprene.

The present invention therefore consists in the production of an ebonite capable of resisting the action of chlorin by the use of as much sulfur as is required by the formula $C_{10}H_{16}S_2$ this mixture being over-vulcanized as much as possible consistently with the preservation of the physical properties of the ebonite to the extent required.

The invention further consists in the addition of from 5 to 15% of graphite to the mixture of rubber and sulfur.

The invention further consists in the improved process for producing ebonites capable of resisting the action of chlorin hereinafter described and in the improved product obtained thereby.

As is known, all raw-rubbers contain resins in addition to the polyprene. Since the quantity of sulfur relative to that of the polyprene in the applicant's mixture is of a definite proportion so as to be able to produce the chemical compound $C_{10}H_{16}S_2$, it is therefore necessary that the raw rubber should contain as small a quantity of resins as possible, so that the ratio between the quantities of polyprene and sulfur shall be disturbed as little as possible by the presence of resins. It is advisable for this reason always to use only good rubber such as para rubber. If rubbers of a medium quality are used they should not contain more than about 4% of resins.

Since the resins take up sulfur, it is advisable to use somewhat more sulfur than corresponds to the formula $C_{10}H_{16}S_2$; this is further desirable in view of the fact that the reaction of addition of sulfur is accelerated and more complete, when some excess of sulfur is present.

The products obtained as above described although improved may be made still more capable of resisting the action of chlorin and the applicant has investigated the effect as regards the power of resisting the action of chlorin, of the addition to the mixture of rubber and sulfur of substances which are chemically inert both to acids and alkali, such as graphite, paraffin, barium sulfate etc. These substances have already been used in the ebonite manufacture, but it was desirable on the one hand to find out how much of a substance, and which of them must be used, so that it does not prove injurious to the ebonite itself i. e. does not destroy the cohesion of the ebonite itself when it has undergone the action of chlorin. On the other hand it is desirable to use as much of these inert substances as possible to more effectually protect the ebonite against the substitution action of chlorin. It was found that graphite especially answered this purpose, when about 10% is added to the rubber sulfur mass. If materially less graphite is taken the life of the ebonite becomes considerably shorter. If materially more graphite is used the ebonite loses more and more its coherence under the action of chlorin and the life of the ebonite is also considerably diminished, so that an ebonite is obtained, the surface of which becomes more and more porous under the action of chlorin and which easily falls to pieces. If however, the vulcanization is carried on in the manner described above, and if on the other hand graphite is added in the quantity mentioned above, a product is obtained of quite an exceptional length of life, and upon which chlorin has practically no influence. The improvement obtained with the new product is evident from the fact that, while most ebonites when they are exposed to the action of chlorin at 65° centigrade rapidly disintegrate, the ebonite produced according to the present invention is capable of resisting the action of chlorin for many years before one millimeter is destroyed by chlorin.

In carrying the invention into effect according to one example, 10 parts of chemically pure finely divided graphite, 33 parts of sulfur, and 57 parts of para rubber are intimately mixed to a homgeneous mass by any known method, and the mixture is then used for the preparation of ebonite plates, as well as for covering iron by hand or in molds in the known manner. An ebonite plate was made. The vulcanization was first conducted slowly, and gradually brought during a period of an hour to two hours to a pressure of about three atmospheres and then kept at this pressure for a suitable time such as from 40 to 45 hours, until the requisite vulcanization was achieved.

The proportions given above may be varied and useful products still obtained, but the results become the worse the more we deviate from the above given proportions, for example a useful product can still be obtained if the sulfur is only about 25 to 27 per cent. but the graphite and the over-vulcanization are correct. The speed with which the correct vulcanization takes place changes naturally with the temperature of vulcanization. It is the greater the higher is the temperature used.

Generally speaking the vulcanization for good ebonite plates should be from 24 to 48 hours and in case of iron plates covered with ebonite, from 12 to 24 hours should suffice. In this case the physical properties of ebonite such as elasticity and flexibility are sufficiently preserved for the purpose. In any case the physical properties becomes somewhat affected through the overvulcanization, and the time of overvulcanization will depend on the particular purpose in view, since the shorter periods of vulcanization give a product capable of resisting chlorin sufficiently for some purposes.

Ebonites produced according to the above process are suitable for all industrial purposes where a substance capable of resisting chemical reagents is required.

Having now described my invention what I claim as new and desire to secure by Letters Patent is:—

1. A process for manufacturing ebonite capable of resisting the action of alkali and chlorin, which consists in forming a mixture of raw rubber with sulfur in the proportions of at least 25% of sulfur to 55% of rubber together with a suitable inert substance, such as graphite, capable of resisting the action of alkali and acids, and in vulcanizing said mixture in case of pure ebonites, substantially longer than 13 hours and in case of iron covered with ebonite at least 13 hours, substantially as described.

2. Ebonite capable of resisting the action of alkali and chlorin, consisting of a mixture of raw rubber with sulfur in the proportion of at least 25% of sulfur to 55% of rubber together with a suitable inert substance, such as graphite, capable of resisting the action of alkali and acids, the mixture being vulcanized in the case of pure ebonites substantially longer than 13 hours, and in case of iron covered with ebonite at least 13 hours, substantially as described.

In testimony whereof, I affix my signature in presence of two witnesses.

MEYER WILDERMANN.

Witnesses:
BERTRAM H. MATTHEWS,
FREDERICK L. RAND.